United States Patent
Xiong et al.

(10) Patent No.: US 11,422,436 B2
(45) Date of Patent: Aug. 23, 2022

(54) UAV AND BODY THEREOF, AND GIMBAL CAMERA

(71) Applicant: SZ DJI TECHNOLOGY CO., LTD., Shenzhen (CN)

(72) Inventors: Rongming Xiong, Shenzhen (CN); Zhenhua Xu, Shenzhen (CN); Xianwu Xiong, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/123,684

(22) Filed: Dec. 16, 2020

(65) Prior Publication Data

US 2021/0271153 A1 Sep. 2, 2021

Related U.S. Application Data

(63) Continuation of application No. PCT/CN2018/094872, filed on Jul. 6, 2018.

(30) Foreign Application Priority Data

Jun. 26, 2018 (CN) .......................... 201820992398.5

(51) Int. Cl.
*G03B 15/00* (2021.01)
*B64C 39/02* (2006.01)
(Continued)

(52) U.S. Cl.
CPC .......... *G03B 15/006* (2013.01); *B64C 39/024* (2013.01); *B64D 47/08* (2013.01); *G03B 17/561* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 2012/0251092 A1* | 10/2012 | Zwaan | B64D 47/08 396/428 |
| 2016/0182774 A1* | 6/2016 | Burkholder | G03B 17/561 348/144 |

(Continued)

FOREIGN PATENT DOCUMENTS

| | | |
|---|---|---|
| CN | 203740114 U | 7/2014 |
| CN | 106428595 A | 2/2017 |

(Continued)

OTHER PUBLICATIONS

The World Intellectual Property Organization (WIPO) International Search Report for PCT/CN2018/094872 dated Apr. 3, 2019 7 Pages (including translation).

*Primary Examiner* — Noam Reisner
(74) *Attorney, Agent, or Firm* — Anova Law Group, PLLC

(57) ABSTRACT

An unmanned aerial vehicle (UAV) includes a body and a gimbal camera. The body includes a housing including an inwardly recessed mounting groove with a notch on one side of the mounting groove, and a protective cover arranged at the housing and configured to open and cover the notch. The gimbal camera includes a mounting frame detachably connected to the housing via the mounting groove; a gimbal arranged at the mounting frame; and a camera arranged at the gimbal. In response to the gimbal camera and the housing being connected via the mounting frame, the gimbal camera is at least partially accommodated in the notch.

14 Claims, 10 Drawing Sheets

(51) Int. Cl.
    *B64D 47/08*     (2006.01)
    *G03B 17/56*     (2021.01)

(56)         References Cited

U.S. PATENT DOCUMENTS

2017/0174362 A1*  6/2017  Zhao .................... G03B 15/006
2017/0225783 A1*  8/2017  Fisher .................. B64C 39/024
2018/0136431 A1*  5/2018  Tian .................... G03B 17/561
2018/0299759 A1* 10/2018  Kuboya ................ G03B 21/16
2020/0218137 A1*  7/2020  Huang .................. G03B 17/04
2020/0346777 A1* 11/2020  Tong .................... B64C 39/024
2021/0271153 A1*  9/2021  Xiong ................... B64C 1/30

FOREIGN PATENT DOCUMENTS

CN      206520760 U     9/2017
CN      206826939 U     1/2018
CN      107856851 A     3/2018
CN      207466986 U     6/2018
WO      2018076347 A1   5/2018

* cited by examiner

UAV AND BODY THEREOF, AND GIMBAL CAMERA

CROSS-REFERENCE TO RELATED APPLICATION

This application is a continuation of International Application No. PCT/CN2018/094872, filed Jul. 6, 2018, which claims priority to Chinese Application No. 201820992398.5, filed Jun. 26, 2018, the entire contents of both of which are incorporated herein by reference.

TECHNICAL FIELD

The present disclosure relates to unmanned aerial vehicle (UAV) technology, and, more particularly, to an unmanned aerial vehicle (UAV) and body thereof, and a gimbal camera.

BACKGROUND

A conventional unmanned aerial vehicle (UAV) generally includes a body, a gimbal mounted at the body, and a camera mounted at the gimbal. The gimbal is configured to change a shooting direction of the camera.

Generally, the gimbal is detachably replaced from the UAV. For example, the UAV is provided with a gimbal mounting groove, and the gimbal is provided with a gimbal buckle cooperating with the gimbal mounting groove. The gimbal buckle is clamped in the gimbal mounting groove to realize mutual fixing of the gimbal and the UAV.

However, in order to facilitate a user to perform disassembly and assembly operations of the gimbal, a space for the user to disassemble and assemble the gimbal needs to be reserved. Therefore, the gimbal mounting groove completely protrudes from the body and has an avoidance area around it, thereby causing an increase in a thickness and volume of the entire body. Therefore, how to reduce a size of the UAV with the removable gimbal needs to be considered.

SUMMARY

In accordance with the disclosure, there is provided an unmanned aerial vehicle (UAV) including a body and a gimbal camera. The body includes a housing including an inwardly recessed mounting groove with a notch on one side of the mounting groove, and a protective cover arranged at the housing and configured to open and cover the notch. The gimbal camera includes a mounting frame detachably connected to the housing via the mounting groove; a gimbal arranged at the mounting frame; and a camera arranged at the gimbal. In response to the gimbal camera and the housing being connected via the mounting frame, the gimbal camera is at least partially accommodated in the notch.

Also in accordance with the disclosure, there is provided a body of the UAV including a housing including an inwardly recessed mounting groove with a notch on one side of the mounting groove, and a protective cover arranged at the housing and configured to open and cover the notch. The mounting groove is configured to cause an external device detachably connected to the housing, such that the external device is at least partially accommodated in the notch and a recess is formed at a front side or a lower side of the body.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples and other drawings conceived by those having ordinary skills in the art on the basis of the described drawings without inventive efforts should fall within the scope of the present disclosure. The same reference numbers will be used throughout the drawings to refer to the same or like parts.

Figure 1:
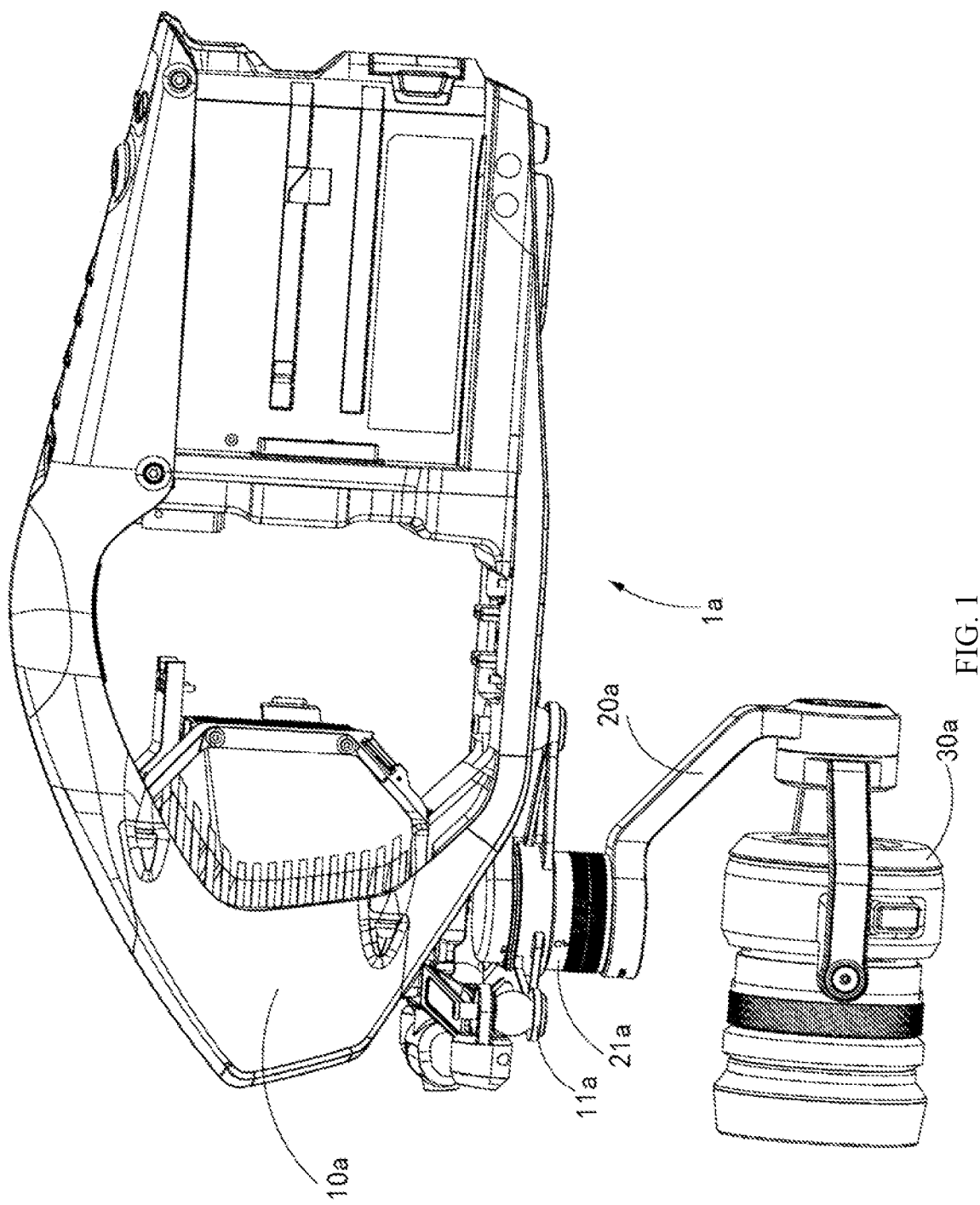
FIG. 1 is a schematic perspective view of an unmanned aerial vehicle (UAV).

| Description of Reference Numerals | | | | | |
|---|---|---|---|---|---|
| 1 | UAV | 100 | Body | 110 | Housing |
| 111 | Mounting groove | 113 | Bottom case | 114 | Shaft hole |
| 117 | Second strip portion | 118 | First strip portion | | |
| 121 | Clamping platform | 122 | Body portion | 123 | Nose portion |
| 130 | Protective cover | 131 | Pivot | 132 | Claw |
| 133 | Vertical plate | 134 | Horizontal plate | 200 | Gimbal camera |
| 210 | Mounting frame | 211 | Mounting base | 215 | First support arm |
| 214 | Second support arm | 232 | Third support arm | 214 | Fourth support arm |
| 220 | Camera | 230 | Gimbal | 233 | First rotation arm |
| 236 | Second rotation arm | 240 | First circuit board | 250 | Fastener |
| 300 | Second circuit board | 400 | Flat cable | 401 | First plug |
| 402 | Second plug | 120b | Nose portion | 123b | Nose body |
| 124b | End cover | 125b | Inner cavity | 300b | Third circuit board |
| 301b | Third socket | 400b | Flat cable | 401b | First plug |
| 402b | Second plug | | | | |

DETAILED DESCRIPTION OF THE EMBODIMENTS

Example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. Unless otherwise defined, the same reference numbers will be used throughout the drawings to refer to the same or like parts.

FIG. 1 is a schematic perspective view of an example unmanned aerial vehicle (UAV) 1a. As shown in FIG. 1, the UAV 1a includes a body 10a, a gimbal 20a, and a camera 30a. The gimbal 20a is mounted at the body 10a, and the camera 30a is mounted at the gimbal 30a. The gimbal 30a can change a shooting direction of the camera 30a.

The gimbal 20a can be detachably replaced from the UAV 1a. The UAV 1a is provided with a gimbal mounting groove 11a, and the gimbal 3a is provided with a gimbal buckle 21a cooperating with the gimbal mounting groove 11a. The gimbal buckle 21a can be clamped in the gimbal mounting groove 11a to realize mutual fixing of the gimbal 3a and the UAV 1a.

Figure 2:
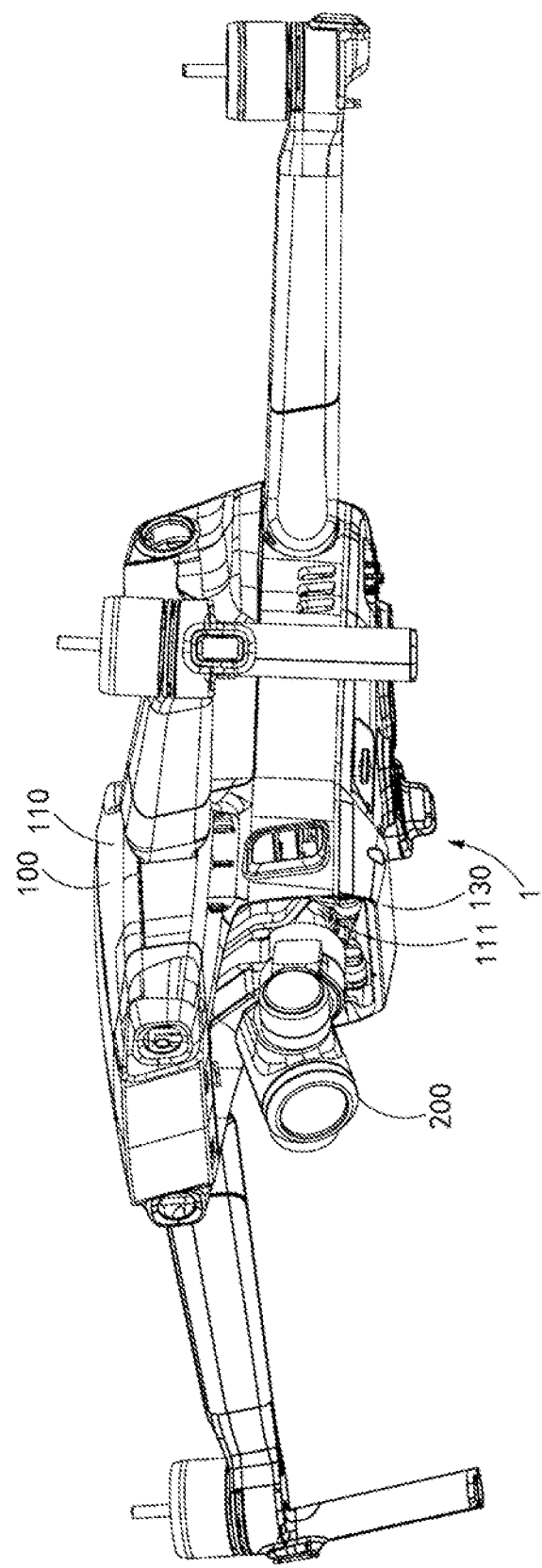
FIG. 2 is a schematic perspective view of a UAV with a protective cover in a closed state consistent with embodiments of the disclosure.

The present disclosure provides a UAV having a structure that can reduce its size. FIG. 2 is a schematic perspective view of an example UAV 1 with a protective cover 130 in a closed state consistent with the disclosure. As shown in FIG. 2, the UAV 1 includes a body 100 and a gimbal camera 200. The gimbal camera 200 is mounted at the body 100. The body 100 may be a housing 110 made out of, for example, a plastic material.

The body 100 includes the housing 110 and the protective cover 130. The housing 110 includes a mounting groove 111 recessed inwardly. A notch is included at one side of the mounting groove 111. In this embodiment, three sides of the mounting groove 111 have side walls, and the three side walls can enclose the mounting groove 111, and a side without the side wall is the notch of the mounting groove 111. The protective cover 130 is provided at the housing 110. In some embodiments, the protective cover 130 may be hinged to the housing 110. In some embodiments, the protective cover 130 may be detachably connected to the housing 110. The protective cover 130 can open and cover the notch.

Figure 3:
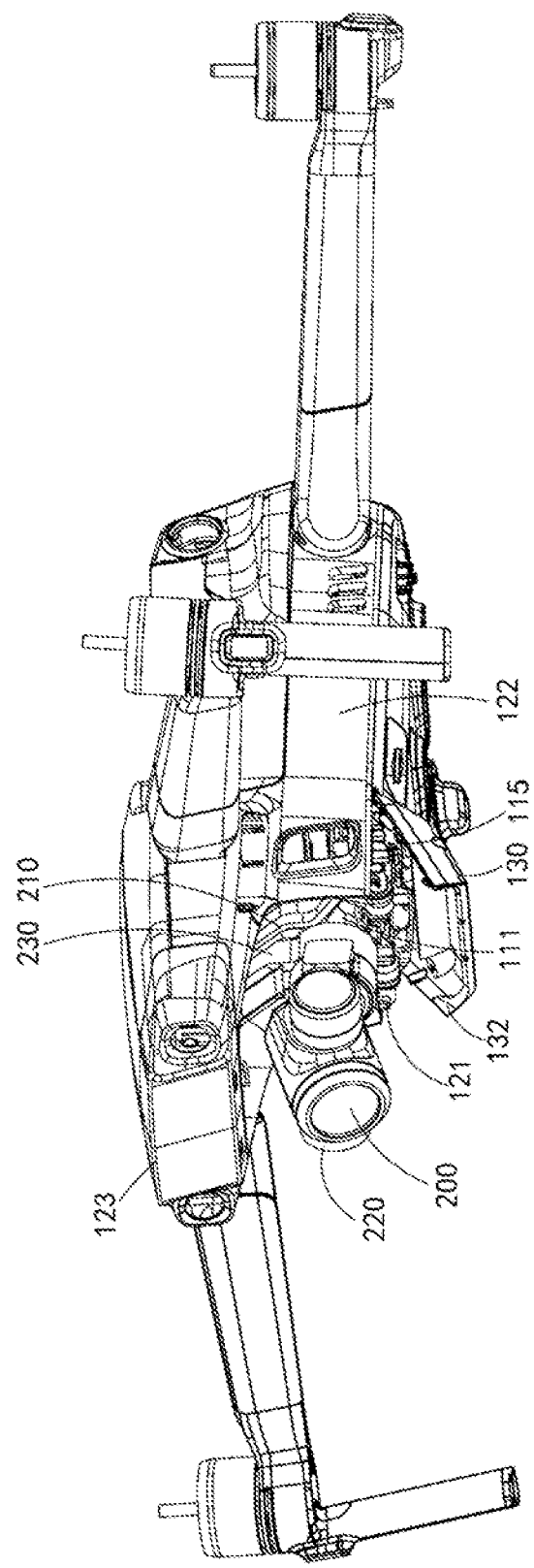
FIG. 3 is a schematic perspective view of a UAV with a protective cover in an open state consistent with embodiments of the disclosure.

FIG. 3 is a schematic perspective view of the UAV 1 with the protective cover 130 in an open state consistent with the disclosure. As shown in FIG. 3, the gimbal camera 200 includes a mounting frame 210, a camera 220, and a gimbal 230. The mounting frame 210 can be detachably connected to the housing 110. The mounting frame 210 is mounted in the mounting groove 111 of the housing 110. The mounting frame 210 and the housing 110 may be connected by a screw. The gimbal 230 is mounted at the mounting frame 210, and the camera 220 is mounted at the gimbal 230. Both the gimbal 230 and the camera 220 can be rotatably connected to the gimbal 230. The gimbal 230 can be configured to change a shooting direction of the camera 220.

As shown in FIG. 3, when the mounting frame 210 of the gimbal camera 200 is mounted in the mounting groove 111 and the protective cover 130 covers the notch, the mounting frame 210 is embedded in the body 100, such that the entire UAV 1 can be more compact. When the gimbal camera 200 is replaced from the UAV 1, it is only needed to remove the protective cover 130 from the notch of the mounting groove 111 to expose the notch. After the notch is exposed, the notch of the mounting groove 111 and an opening at a top of the mounting groove 111 can form an operation space for removing the mounting frame 210, such that the mounting frame 210 of the gimbal camera 200 can be easily removed from the housing 110. For example, when the mounting frame 210 and the housing 110 are screwed together, a screwdriver can be used to unscrew the screws, and then the mounting frame 210 can be removed from the space between the notch and the opening at the top of the mounting groove 111.

Figure 4:
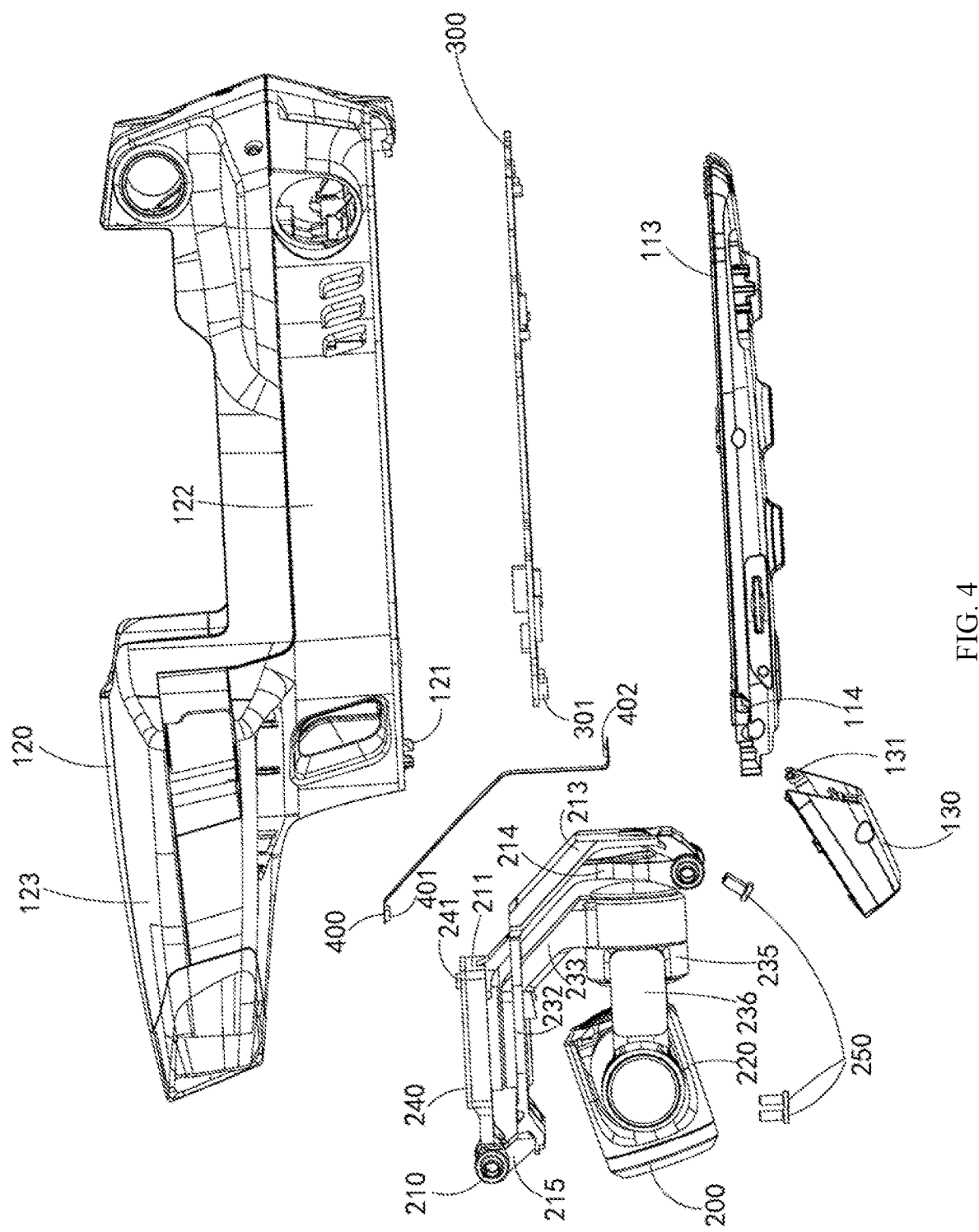
FIG. 4 is a schematic disassembly diagram of a UAV consistent with embodiments of the disclosure.

FIG. 4 is a schematic disassembly diagram of the UAV 1 consistent with the disclosure. For example, as shown in FIG. 4, the housing 110 includes an upper case 120 and a bottom case 113. The upper case 120 includes a body portion 122 and a nose portion 123. The body portion 122 and the nose portion 123 can be components of the thin housing 110. The body portion 122 can have a long cylindrical shape arranged substantially horizontally. One end of the body portion 122 is a front end, and another end of the body portion 122 is a rear end. The nose portion 123 can be connected to the body portion 122. The nose portion 123 can be arranged at the front end of the body portion 122. Both the nose portion 123 and the body portion 122 can have inner cavities. The inner cavity of the nose portion 123 and the inner cavity of the body portion 122 can communicate with each other. The mounting groove 111 can extend from the front end of the body portion 122 to a bottom end of the nose portion 123.

Figure 5:
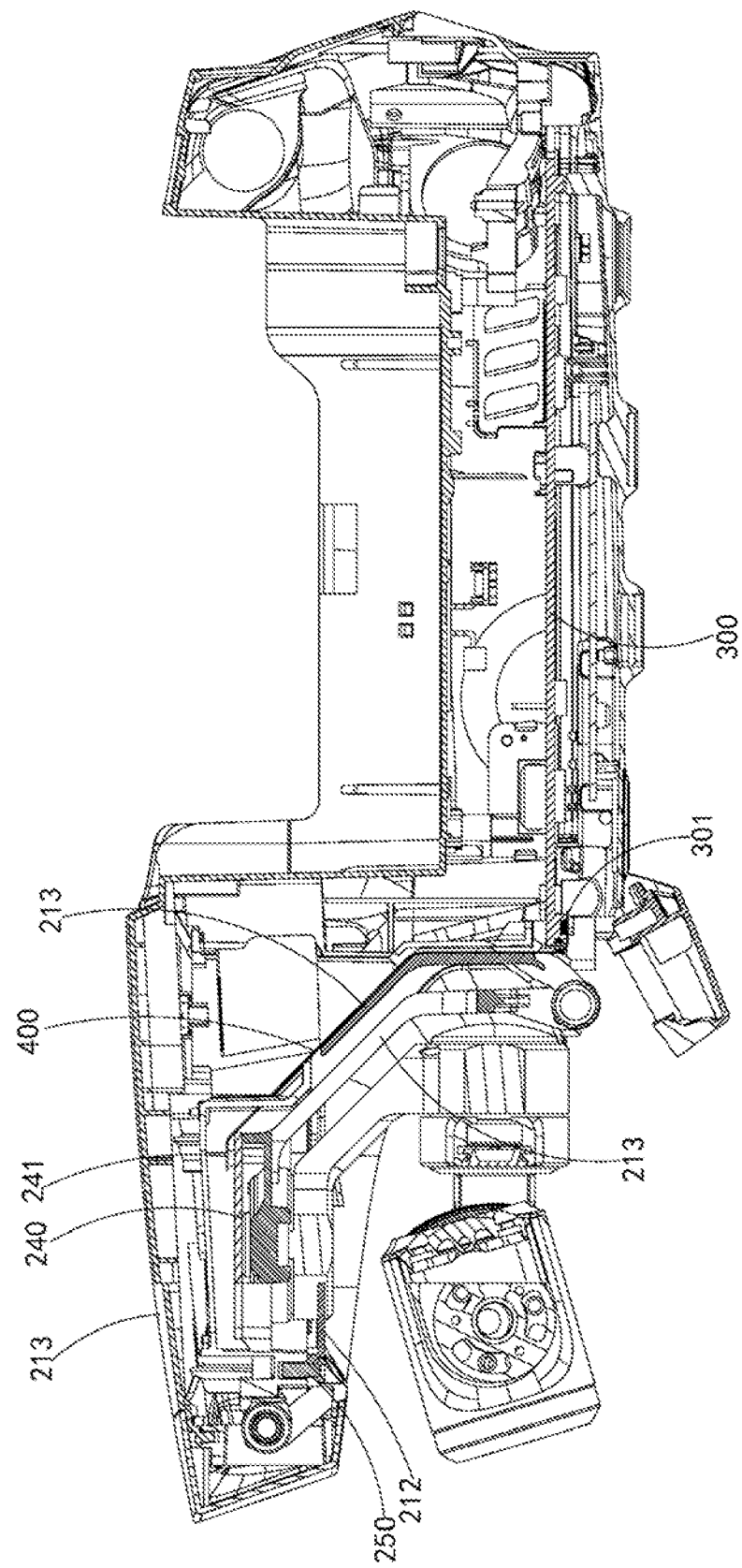
FIG. 5 is a schematic cross-sectional view of a UAV consistent with embodiments of the disclosure.

FIG. 5 is a schematic cross-sectional view of the UAV 1 consistent with the disclosure. As shown in FIG. 5, an overall structure of the mounting frame 210 can include a substantially elongated structure. Referring again to FIG. 3, the mounting frame 210 can extend along the mounting groove 111. As shown in FIG. 5, the UAV 1 further includes a plurality of fasteners 250. The plurality of fasteners 250 can include screws. The plurality of fasteners 250 can connect the mounting frame 210 and the housing 110 together. In some embodiments, some of the plurality of fasteners 250 can connect the mounting frame 210 and the nose portion 123 together, and the others of the plurality of fasteners 250 can connect the mounting frame 210 and the body portion 122 together. This kind of installation can be more stable.

Referring again to FIGS. 3 and 4, a bottom opening is included under the body portion 122. The bottom opening can communicate with the inner cavity of the body portion 122. The bottom case 113 can have a substantially plate shape. The bottom case 113 can cover the bottom opening. The bottom case 113 and the body portion 122 can be detachably connected via, for example, a snap connection or a screw connection.

Figure 6:
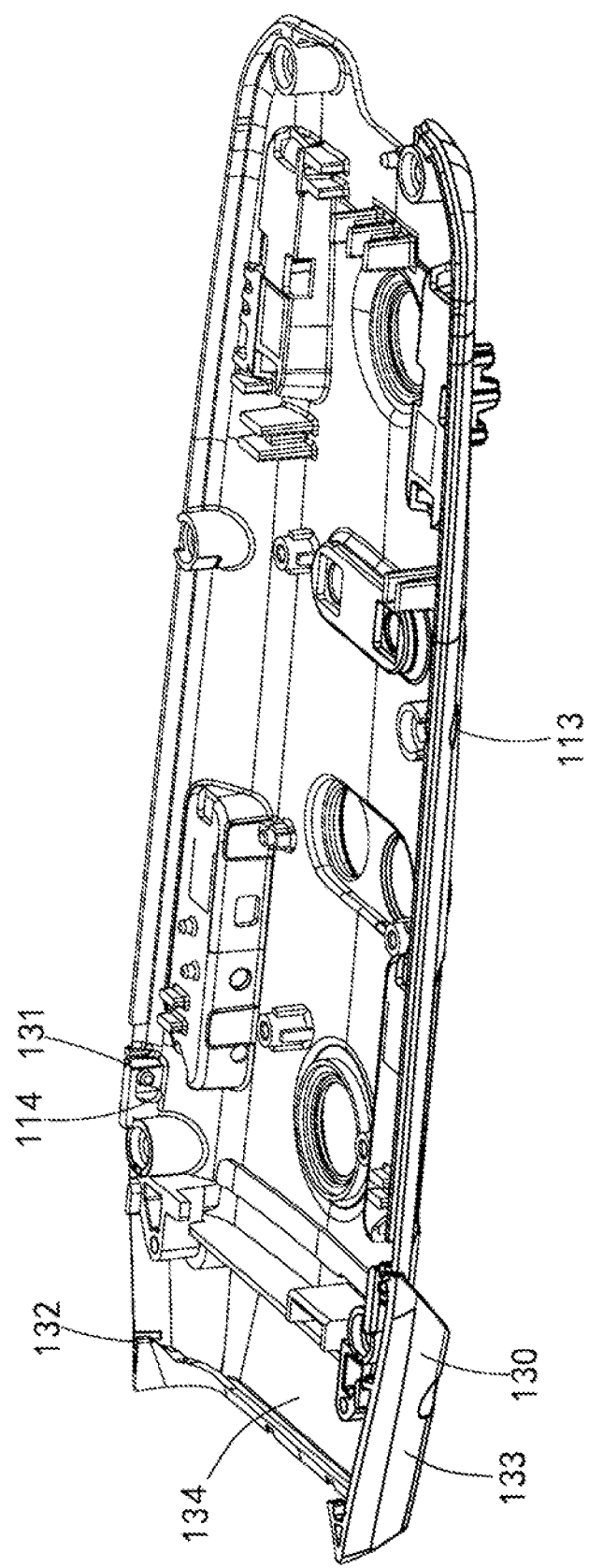
FIG. 6 is a schematic perspective view showing an assembly of a bottom case and a protective cover consistent with embodiments of the disclosure.

FIG. 6 is a schematic perspective view showing an assembly of the bottom case 113 and the protective cover 130 consistent with the disclosure. For example, as shown in FIGS. 5 and 6, an end of the bottom case 113 facing the same direction as the front end of the body portion 122 is the front end. The front end of the bottom case 113 includes two shaft holes 114. The two shaft holes 114 can be provided at two sides of the bottom case 113. The two shaft holes 114 can be aligned with each other.

The protective cover 130 can be arranged at the front end of the bottom case 113. The protective cover 130 includes a horizontal plate 134, two vertical plates 133, and two pivots 131. The two vertical plates 133 can be arranged vertically. The horizontal plate 134 can be arranged horizontally. The two vertical plates 133 can extend from opposite ends of the horizontal plate 134. The two vertical plates 133 can extend toward the same side of the horizontal plate 134, for example, both extend upward. An edge of each vertical plate 133 can be aligned with an edge of the horizontal plate 134. The two pivots 131 can be arranged at the two vertical plates 133 and located between the two vertical plates 133. The two pivots 131 can extend toward each other from the two vertical plates 133. The two pivots 131 can be aligned with each other. The pivot 131 can have a cylindrical shape. The two shaft holes 114 of the bottom case 113 can be located between the two vertical plates 133 of the protective cover 130. The two pivots 131 can be inserted into the two shaft holes 114. As such, the protective cover 130 can be pivotally connected to the bottom case 113. When the notch needs to be opened, it can be achieved by turning the protective cover 130 downward. The protective cover 130 can be pivotally connected to the bottom case 113 and can be not easy to lose.

For example, as shown in FIG. 6, the protective cover 130 further includes two claws 132. The two claws 132 are arranged at the two vertical plates 133. On each vertical plate 133, the pivot 131 is arranged at one end of the vertical plate 133, and the claw 132 is arranged at another end of the vertical plate 133. Each claw 132 may have a bar shape. Each claw 132 can extend in a direction toward the corresponding pivot 131.

Referring again to FIG. 4, the housing 110 further includes two clamping platform 121. The two clamping platforms 121 can be arranged at the body portion 120 of the housing 110. The two clamping platforms 121 can be arranged at two side walls of the notch. Each clamping platform 121 can extend toward the protective cover 130. Each clamping platform 121 can have a clamping slot. The clamping slot can extend in the horizontal direction. In this embodiment, the clamping slot can extend from an end of the clamping platform 121 distal from the shaft hole 114 toward the shaft hole 114. For example, a width of the clamping slot can gradually narrow along the extension direction.

Figure 7:
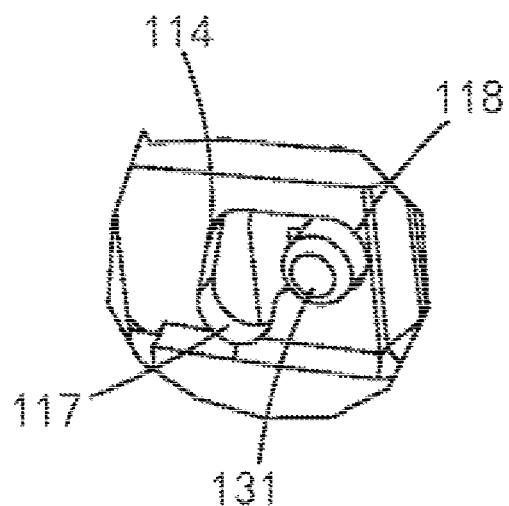
FIG. 7 is a schematic partial enlarged view of a shaft hole in FIG. 6 consistent with embodiments of the disclosure.

FIG. 7 is a schematic partial enlarged view of the shaft hole 114 in FIG. 6 consistent with the disclosure. As shown in FIG. 7, the shaft hole 114 includes a first strip portion 118. An extension direction of the first strip portion 118 is the same as the extension direction of the clamping slot on the clamping platform 121. The two claws 132 can be inserted into the two clamping slots.

FIG. 7 shows the partial enlarged view of the shaft hole 114 when the protective cover 130 is in the closed state. In the closed state, the two claws 132 are inserted into the two clamping slots, and the pivot 131 is located in the first strip portion 118 and at an end of the first strip portion 118 distal from the clamping platform 121. The two claw 132 are clamped in the slots, and the protective cover 130 is locked. When the protective cover 130 needs to be opened, it is only needed to pull the two claws 132 out of the slots along the extension direction of the slots, such that the pivot 131 can be located at the end of the first strip 118 close to the clamping platform 121, and then turn over the protective cover 130.

For example, the shaft hole 114 further includes a second strip portion 117. The second strip portion 117 is connected to the end of the first strip portion 118 close to the clamping platform 121. The second strip portion 117 extends from the end of the first strip portion 118 close to the clamping platform 121 in a direction away from the notch. In FIG. 7, the second strip portion 117 extends downward.

Figure 8:
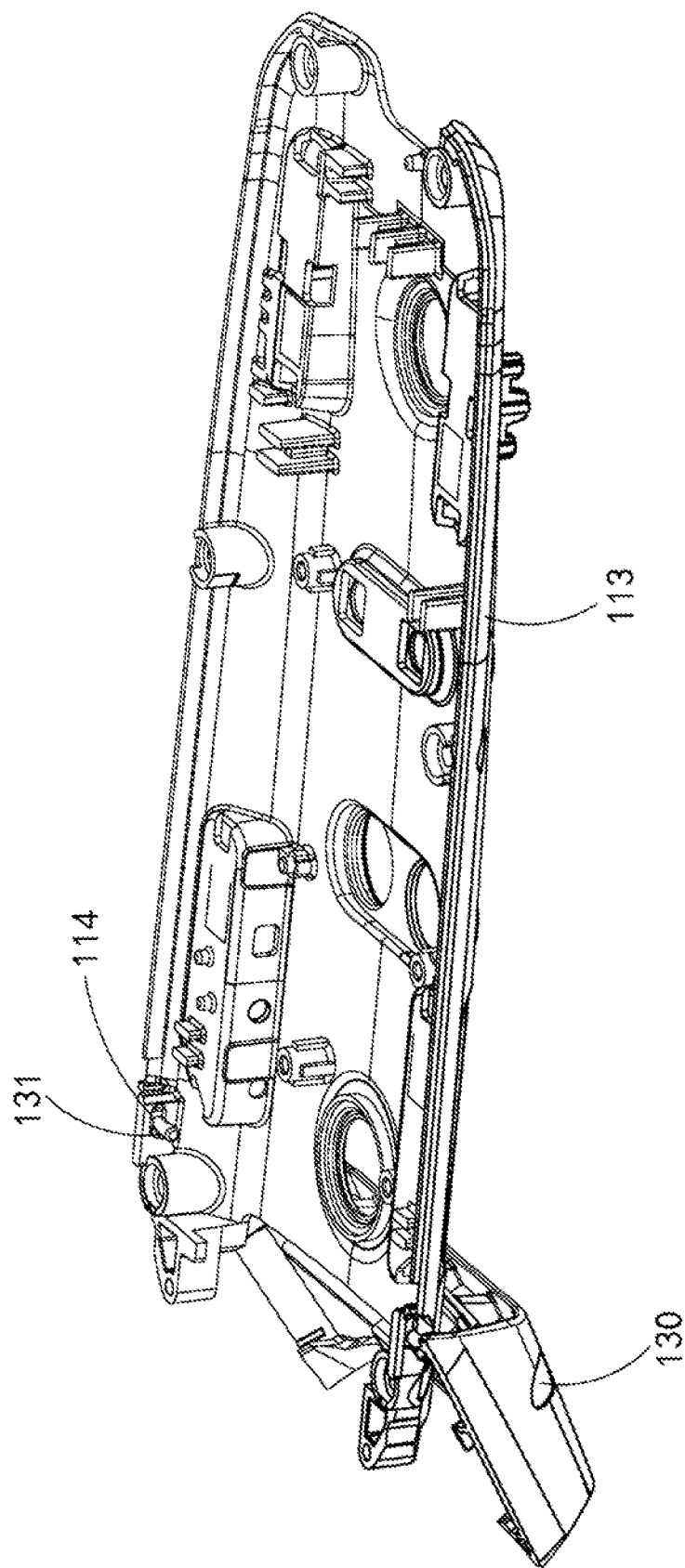
FIG. 8 is a schematic perspective view showing another assembly of a bottom case and a protective cover consistent with embodiments of the disclosure.
Figure 9:
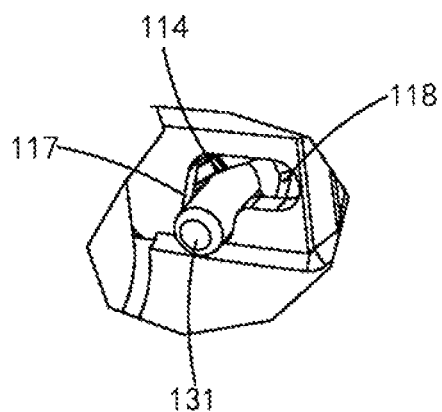
FIG. 9 is a schematic partial enlarged view of a shaft hole in FIG. 8 consistent with embodiments of the disclosure.

FIG. 8 is a schematic perspective view showing another assembly of the bottom case 113 and the protective cover 130 consistent with the disclosure. FIG. 9 is a schematic partial enlarged view of the shaft hole 114 in FIG. 8 consistent with the disclosure. As shown in FIGS. 8 and 9, during a process of opening the protective cover 130, the pivot 131 is also moved to a lowest end of the second strip portion 117, and then the protective cover 130 is turned over. During a turning process, a degree of interference between the protective cover 130 and the bottom case 113 is smaller, and a turning angle of the protective cover 130 can be greater, thereby causing the disassemble and assemble of the gimbal camera 200 to be much easier.

Referring again to FIGS. 4 and 5, for example, the gimbal camera 200 further includes a first circuit board 240. The first circuit board 240 is arranged at the mounting frame 210. The first circuit board 240 can include functional modules of the gimbal camera 200. A first socket 241 is further arranged at the first circuit board 240.

The UAV further includes a second circuit board 300 and a flat cable 400. The second circuit board 300 can include multiple functional modules of the UAV, such as a communication module and the like. The second circuit board 300 is arranged in the housing 110, e.g., in the inner cavity of the body portion 122. The second circuit board 300 can be removed from the bottom case 113. A second socket 301 is further arranged at the second circuit board 300. The flat cable 400 includes a first plug 401 and a second plug 402. The first plug 401 can be plugged into the first socket 241, and the second plug 402 can be plugged into the second socket 301. The flat cable 400 can electrically connect the first circuit board 240 and the second circuit board 300 to each other.

When the gimbal camera 200 needs to be removed, it is only needed to separate the first plug 401 from the first socket 241 and/or the second socket 301 from the second socket 301, such that the circuits on the first circuit board 240 and the second circuit board 300 can be separated from each other. The flat cable 400 may include a flexible printed circuit (FPC) flat cable 400. For example, the flat cable 400 can extend along the mounting frame 210.

As shown in FIG. 4, for example, the mounting frame 210 includes a mounting base 211, a first support arm 215, a second support arm 214, a third support arm 232 and a fourth support arm 213. The mounting base 211 can have a frame structure. The first support arm 215 and the second support arm 214 can be arranged at opposite ends of the mounting base 211. Both the first support arm 215 and the second support arm 214 can extend diagonally downward. The first support arm 215 can be shorter than the second support arm 214. The third supporting arm 232 can extend horizontally from an end of the first supporting arm 215 distal from the mounting base 211 toward the second supporting arm 214. A top end of the third support arm 232 can extend beyond the second support arm 214. Two ends of the fourth support arm 213 can be connected to an end of the third support arm 232 distal from the first support arm 215 and an end of the second support arm 214 distal from the mounting base 211. The third support arm 232 can be detachably connected to the nose portion 123, and the four support arms can be detachably connected to the body portion 122. The first circuit board 240 can be arranged at the mounting base 211. In some embodiments, the first circuit board 240 can be arranged at a top of the mounting base 211. A bottom of the mounting base 211 can be connected to the gimbal 230. As such, the mounting frame 210 can be more stable and lighter, and can leave enough space for the gimbal 230 to move.

As shown in FIG. 4, for example, the gimbal 230 includes a first rotation arm 233 and a second rotation arm 236. The first rotation arm 233 is inclined. One end of the first rotation arm 233 can be rotatably connected to the mounting base 211, and another end can be rotatably connected to the second rotation arm 236. A rotating axis of the first rotation arm 233 on the mounting base 211 can be vertically arranged, and a rotating axis of the second rotation arm 236 on the first rotation arm 233 can be arranged horizontally. An end of the second rotation arm 236 distal from the first rotation arm 233 can be rotatably connected to the camera 220. A rotation axis of the camera 220 on the first rotation arm 233 can be horizontal and perpendicular to a rotation axis of the second rotation arm 236 on the first rotation arm 233. As such, the gimbal can adjust the camera 220 to shoot in all directions.

Figure 10:
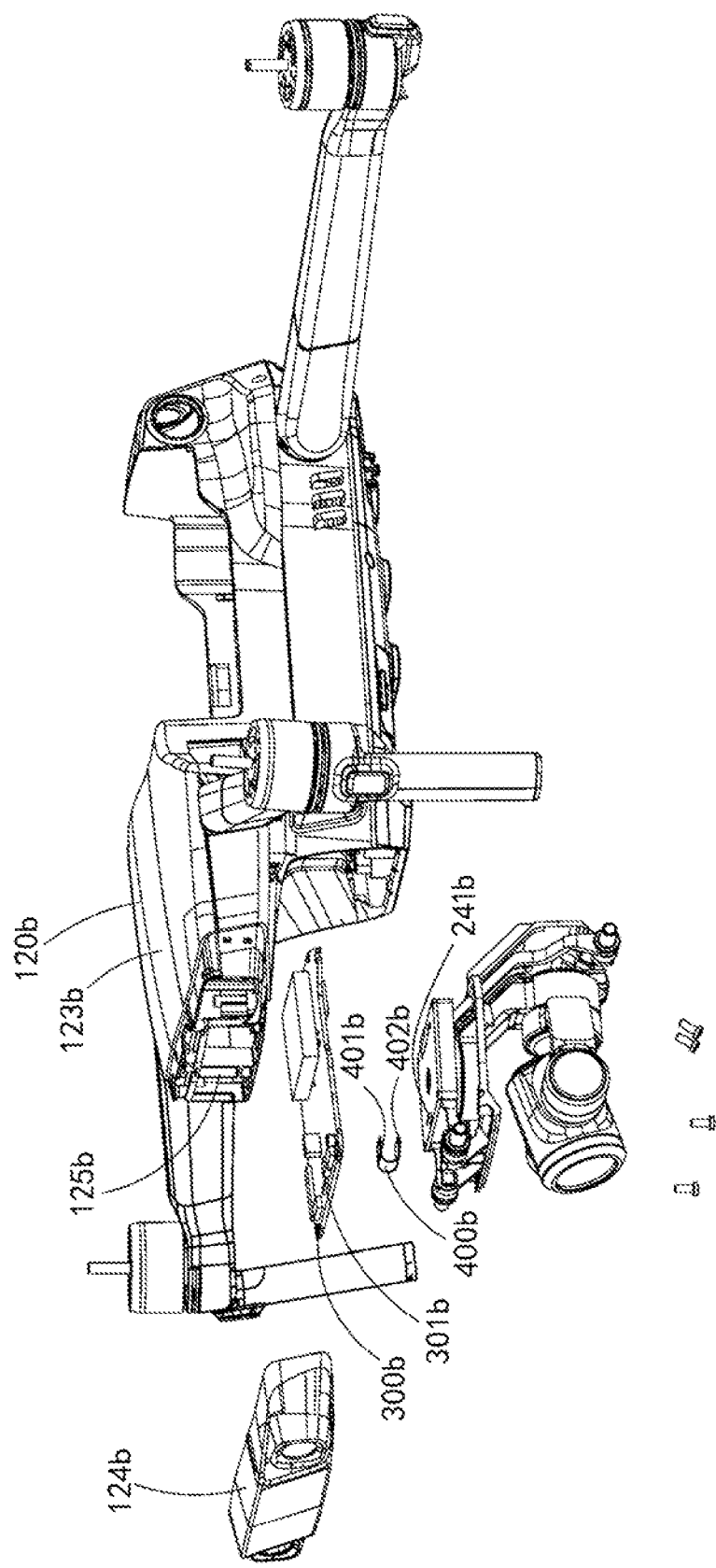
FIG. 10 is a schematic disassembly diagram of a UAV consistent with embodiments of the disclosure.

FIG. 10 is a schematic disassembly diagram of the UAV 1 consistent with the disclosure. As shown in FIG. 10, compared with the UAV 1 shown in FIG. 4, the UAV 1 in FIG. 10 has a different nose structure and cable connection. In addition, the UAV 1 in FIG. 10 further includes a third circuit board 300b. Detailed description of the similarities between them will be omitted herein.

In this embodiment, a nose portion 120b includes a nose body 123b and an end cover 124b. A front end of the nose body 123b is open. The end cover 124b can be connected to the nose body 123b. The end cover 124b can cover an opening of the nose body 123b. The end cover 124b and the nose body 123b can have a detachable connection therebetween, for example, a snap connection.

The third circuit board 300b can be arranged in an inner cavity 125b of the nose body 123b. The third circuit board 300b can include a third socket 301b. A first plug 401b and a second plug 402b can be arranged at both ends of the flat cable 400b. The first plug 401b can be plugged into the first socket 241b of the first circuit board 240b, and the second plug 402b can be plugged into the third socket 301b. As such, the first circuit board 240b and the third circuit board 300b can be electrically connected, and the flat cable 400b can have a shorter length.

When the gimbal camera needs to be removed, the end cover 124b can be firstly removed from the nose portion 120b, and then the first plug 401b can be separated from the first socket 241b and/or the second socket 301b can be separated from the third socket 301b. As such, the circuits on the first circuit board 240 and the third circuit board 300b can be separated from each other. The flat cable 400b may include an FPC cable.

It should be understood that the various examples described above may be utilized in multiple directions (e.g., inclined, inverted, horizontal, vertical, or the like) and in multiple configurations without departing from the principles of the present disclosure. The embodiments shown in the drawings are merely as examples, and the present disclosure is not limited to any specific details of these embodiments.

Various modifications, additions, substitutions, deletions, and other changes of the specified embodiments will be apparent to those skilled in the art from consideration of the description of the embodiments disclosed herein. It can be appreciated that the detailed description be considered as illustration and example, and the spirit and scope of the present invention are only limited by the appended claims and their equivalents.

What is claimed is:

1. An unmanned aerial vehicle (UAV) comprising: a body including: a housing including an inwardly recessed mounting groove with a notch on one side of the mounting groove; and a protective cover arranged at the housing and configured to open and cover the notch; a gimbal camera including: a mounting frame detachably connected to the housing via the mounting groove; a first circuit board mounted at the mounting frame; a gimbal arranged at the mounting frame; and a camera arranged at the gimbal; a second circuit board arranged in the housing; and a flat cable having two ends electrically connected to the first circuit board and the second circuit board, and configured to be detachably connected to at least one of the first circuit board or the second circuit board; wherein when the gimbal camera and the housing are connected via the mounting frame, the gimbal camera is at least partially accommodated in the notch; wherein: one end of the protective cover is hinged to the housing; the protective cover includes: a horizontal plate; two vertical plates protruding from opposite ends of the horizontal plate to a same side; and two pivots aligned and protruding toward each other from the two vertical plates; and the housing includes two shaft holes for accommodating the two pivots; wherein: the protective cover further includes two claws arranged at the two vertical plates; for each vertical plate, one of the two pivots is arranged at one end of the vertical plate, and one of the two claws is arranged at another end of the vertical plate and extends toward the corresponding pivot; the housing further includes two clamping platforms extending from two side walls of the notch toward the protective cover; each clamping platform includes a clamping slot extending from an end of the clamping platform distal from the corresponding shaft hole toward the corresponding shaft hole; each shaft hole includes a strip portion having an extension direction same as an extension direction of the corresponding clamping slot; and the two claws are configured to be inserted in the two clamping slots.

2. The UAV according to claim 1, wherein: the strip portion is a first strip portion; and each shaft hole further includes a second strip portion extending from an end of the first strip portion close to the clamping platform in a direction away from the notch.

3. The UAV according to claim 1, wherein the housing is connected to the mounting frame by screws.

4. The UAV according to claim 1, wherein:
the housing includes an upper housing including:
    a body portion having a cylindrical shape; and
    a nose portion arranged at a front end of the body portion;
the mounting groove extends from the front end of the body portion to a bottom end of the nose portion;
the mounting frame extends along the mounting groove; and
the mounting frame is detachably connected to the nose portion and the body portion.

5. The UAV according to claim 4, wherein the second circuit board is arranged in the body portion.

6. The UAV according to claim 1, wherein:
the camera is arranged outside the mounting groove; and
the gimbal is configured to change a shooting direction of the camera.

7. The UAV according to claim 1, wherein:
the housing includes:
    a body portion having a cylindrical shape; and
    a nose portion arranged at a front end of the body portion and including:
        a nose body having an opening; and
        an end cover arranged at the opening and detachably connected to the nose body; and
the second circuit board is arranged in the nose body.

8. A body of an unmanned aerial vehicle (UAV) comprising: a housing including an inwardly recessed mounting groove with a notch on one side of the mounting groove; a circuit board arranged in the housing; a flat cable electrically and detachably connected to the circuit board and a circuit board of an external device; and a protective cover arranged at the housing and configured to open and cover the notch; wherein the mounting groove is configured to cause the external device to be detachably connected to the housing, such that the external device is at least partially accommodated in the notch and a recess is formed at a front side or a lower side of the body; wherein: one end of the protective cover is hinged to the housing; the protective cover includes: a horizontal plate; two vertical plates protruding from opposite ends of the horizontal plate to a same side; and two pivots aligned and protruding toward each other from the two vertical plates; and the housing includes two shaft holes for accommodating the two pivots; wherein: the protective cover further includes two claws arranged at the two vertical plates; for each vertical plate, one of the two pivots is arranged at one end of the vertical plate, and one of the two claws is arranged at another end of the vertical plate and extends toward the corresponding pivot; the housing further includes two clamping platforms extending from two side walls of the notch toward the protective cover; each clamping platform includes a clamping slot extending from an end of the clamping platform distal from the corresponding shaft hole toward the corresponding shaft hole; each shaft hole includes a strip portion having an extension direction same as an extension direction of the corresponding clamping slot; and the two claws are configured to be inserted in the two clamping slots.

9. The body according to claim 8, wherein the external device is a gimbal camera including:
a mounting frame detachably connected to the housing via the mounting groove;
a gimbal arranged at the mounting frame; and
a camera arranged at the gimbal.

10. The body according to claim 8, wherein:
the strip portion is a first strip portion; and
each shaft hole further includes a second strip portion extending from an end of the first strip portion close to the clamping platform in a direction away from the notch.

11. The body according to claim 8, wherein:
the housing includes an upper housing including:
a body portion having a cylindrical shape; and
a nose portion arranged at a front end of the body portion;
the mounting groove extends from the front end of the body portion to a bottom end of the nose portion.

12. The body according to claim 11, wherein the circuit board of the body of the UAV is arranged in the body portion.

13. The body according to claim 8, wherein:
the housing includes:
a body portion having a cylindrical shape; and
a nose portion arranged at a front end of the body portion and including:
a nose body having an opening; and
an end cover arranged at the opening and detachably connected to the nose body; and
the circuit board is arranged in the nose body; and
two ends of the flat cable are electrically and detachably connected to the circuit board and the circuit board of the external device, respectively.

14. A body of an unmanned aerial vehicle (UAV) comprising: a housing including: an inwardly recessed mounting groove with a notch on one side of the mounting groove; and two shaft holes; and a protective cover arranged at the housing and configured to open and cover the notch, the protective cover including: a horizontal plate; two vertical plates protruding from opposite ends of the horizontal plate to a same side; and two pivots aligned and protruding toward each other from the two vertical plates, the two pivots being accommodated in the two shaft holes; wherein the mounting groove is configured to cause an external device to be detachably connected to the housing, such that the external device is at least partially accommodated in the notch and a recess is formed at a front side or a lower side of the body; wherein one end of the protective cover is hinged to the housing; wherein the protective cover further includes: two claws arranged at the two vertical plates; for each vertical plate, one of the two pivots is arranged at one end of the vertical plate, and one of the two claws is arranged at another end of the vertical plate and extends toward the corresponding pivot; the housing further includes two clamping platforms extending from two side walls of the notch toward the protective cover; each clamping platform includes a clamping slot extending from an end of the clamping platform distal from the corresponding shaft hole toward the corresponding shaft hole; each shaft hole includes a strip portion having an extension direction same as an extension direction of the corresponding clamping slot; and the two claws are configured to be inserted in the two clamping slots.

* * * * *